US 6,706,106 B1

(12) United States Patent
Nägele et al.

(10) Patent No.: US 6,706,106 B1
(45) Date of Patent: Mar. 16, 2004

(54) COMPOSITION FOR THE PRODUCTION OF SHAPED BODIES AND METHOD FOR THE PRODUCTION OF SHAPED BODIES MADE OF SAID COMPOSITION

(75) Inventors: Helmut Nägele, Pfinztal (DE); Jürgen Pfitzer, Pfinztal (DE); Emilia Inone, Pfinztal (DE); Peter Eyerer, Karlsrhe (DE); Norbert Eisenreich, Pfinztal (DE); Wilhelm Eckl, Karlsruhe (DE)

(73) Assignees: Fraunhofer-Gesellschaft zur Förderung der angewandten Forschung e.V., München (DE); TECNARO Gesellschaft zur industriellen Anwendung nachwachsender Rohstoffe mbH, Eisenach (DE)

( * ) Notice: Subject to any disclaimer, the term of this patent is extended or adjusted under 35 U.S.C. 154(b) by 0 days.

(21) Appl. No.: 09/831,291
(22) PCT Filed: Nov. 9, 1999
(86) PCT No.: PCT/EP99/08593
§ 371 (c)(1),
(2), (4) Date: Jul. 26, 2001
(87) PCT Pub. No.: WO00/27924
PCT Pub. Date: May 18, 2000

(30) Foreign Application Priority Data

Nov. 11, 1998 (DE) .......................................... 198 52 034

(51) Int. Cl.[7] ............................ C08L 97/00; C08L 97/02
(52) U.S. Cl. .............................. 106/123.11; 106/164.41; 106/242
(58) Field of Search ....................... 106/123.11, 164.41, 106/242

(56) References Cited

U.S. PATENT DOCUMENTS

| 2,707,686 | A | | 5/1955 | Salimuzzaman | |
| 4,225,359 | A | * | 9/1980 | Schneider | .................. 106/669 |
| 6,379,446 | B1 | * | 4/2002 | Andersen et al. | ......... 106/162.5 |

FOREIGN PATENT DOCUMENTS

| DE | 004331747 A1 | * | 3/1995 |
| DE | 019852034 C1 | * | 4/2000 |

* cited by examiner

Primary Examiner—Helene Klemanski
(74) Attorney, Agent, or Firm—Paul Vincent

(57) ABSTRACT

The invention concerns a composition for the production of shaped bodies, consisting of polymer lignin, shellac and natural fibers and also a method for the production of shaped bodies from such a composition via production of a shaped body through extrusion.

13 Claims, No Drawings

COMPOSITION FOR THE PRODUCTION OF SHAPED BODIES AND METHOD FOR THE PRODUCTION OF SHAPED BODIES MADE OF SAID COMPOSITION

Translation of PCT/EP99/08593 as filed on Nov. 9, 1999

BACKGROUND OF THE INVENTION

The invention concerns a composition for the production of shaped bodies and a method for the production of shaped bodies made of such a composition.

The increased supply of mineral oils and their thermal processing for producing energy as well as their synthesis into plastic material has led to a steady increase in the carbon dioxide content ($CO_2$) of the earth's atmosphere. The rising $CO_2$ content in the atmosphere is made partly responsible for the global greenhouse effect and the resulting climate changes of the earth. To limit accumulation of $CO_2$ in the atmosphere, it is necessary to close the $CO_2$ cycle. This means that only an amount of $CO_2$ should be given off into the atmosphere within a certain time period which nature can transfer into organic solid matter through photosynthesis. This is, however, clearly not the case for plastic materials gained synthetically from crude oil. Synthetic plastic materials cannot be disposed of in a $CO_2$ neutral fashion after their period of use since more plastic waste is burned than crude oil produced by renewed synthesis, which unavoidably results in $CO_2$ accumulation in the atmosphere.

The major group of synthetic plastic materials is thermoplastic materials. They are transferred into a plastic state using extruders, injection molding machines or hot-shaping presses under the influence of energy either as heat or friction, and are formed, in molds or tools, into the desired shaped body. If it were possible to generate a material which is exclusively gained from rapidly growing resources and which could be easily processed with conventional thermal shaping machines, the balance would be considerably better with regard to both ecology and economy.

There are a few natural materials which would be suitable for such applications e.g. in particular polysaccharides (cellulose, starch) proteins or lignins. However, thermal shaping of these polymers is problematic and materials which must be reinforced with fibers to stabilize their shapes, e.g. cellulose fibers, require the addition of a natural processing aid. Shellac has proven to be such a processing aid in accordance with the invention. Shellac is produced by the louse "kerria lacca" to protect their eggs from external weather effects and can be melted at temperatures of around approximately 80° C. The good film forming properties of shellac contribute to favorable processing properties of the natural fiber mixture using extruders, injection molding machines or presses.

SUMMARY OF THE INVENTION

In accordance with the invention, lignin is used as a further thermoplastic binding agent for natural fibers which is derived from the most different cellulose disintegrating methods. However, the thermoplastic behavior of lignin after cellulose disintegration is poor and is insufficient for shaping it into a thermoplastic compound with natural fibers.

Only a combination of the natural fibers, e.g. cellulose (as reinforcing material or filler), lignin (as binding agent for the fiber) and shellac (as processing aid) leads to compounds which can be processed and having good mechanical and thermal properties which are solely made from growing raw materials and are suitable for high quality technological applications.

In contrast to known attempts with compositions of mostly natural components (EP 0 720 634), the inventive composition in accordance with the claims offers the following advantages:

compounds of 100% growing raw materials (closed $CO_2$ cycle), direct processing of flowable mixtures (no thermal pre-stages for the generation of the mixture which protects the mixing components and reduces odor due to the reduced portion of disintegrated products), cold compacting with poorly flowable mixtures (no thermal loading which protects the mixing components and reduces odors through reduced portion of disintegrated products), no proteins (less expensive compounds, reduced danger of mold in the compounds or the shaped parts), no acid is used (reduced wear of the processing machine or the tools), no glycol or glycerin (no unhealthy emissions during processing), all lignins from all cellulose disintegration methods can be used (ligneous sulfonates, kraft lignin, lignin in organic solution, lignin in water solution)

low processing temperatures are possible through shellac (no thermal loading to protect the mixing components and reduce odor due to reduced portion of disintegrated products).

In a preferred embodiment of the composition in accordance with the invention, the composition contains up to 80% lignin, up to 80% natural fibers, and up to 70% shellac. The natural fibers of the composition in accordance with the invention preferably have dimensions between 10 µm and 10,000 µm. With regard to the method in accordance with the invention, a preferred embodiment thereof comprises the additional step of adding native oil sliding agent to the dry mixture. The sliding agent is preferably added prior to the first step of the method in accordance with the invention in which the dry mixture of polymer lignin, shellac, and natural fibers is thermally plastify. Alternatively, the sliding agent can be added during this step.

DESCRIPTION OF THE PREFERRED EMBODIMENT

The flowable powdery mixtures in accordance with the invention or the cold-pressed granulated matter of cellulose fibers or powder with lignin and shellac can be used wherever plastic materials or naturally grown wood is used in shaped parts or work pieces, e.g. in the automotive, construction, furniture, packing, or electronic industry.

EXAMPLES

1. Powdery lignin, wood fibers and shellac are mechanically processed into a homogeneous mixture. The portion of lignin is thereby 45%, the portion of wood fibers is 50% and the portion of shellac is 5%. All components are in a powdery or fibrous state which permits homogeneous premixing. The flowable mixture is subsequently disposed onto an injection molding machine and formed into a shaped part.
2. In case the pre-mixture cannot be directly introduced to an injection molding machine or an extruder due to poor flowability, it is previously transferred into flowable pellets using the press agglomeration method. The pellets are subsequently introduced to an injection molding machine, an extruder or a heat shaping press, are plastified and formed into a shaped part.

We claim:

1. A composition for the production of a shaped body, the composition consisting essentially of:
   polymer lignin;
   shellac; and
   natural fibers.

2. The composition of claim 1, wherein said lignin is at least one of lignin from a conventional cellulose disintegration method, ligneous sulfonate, kraft lignin, lignin in organic solution, and lignin in water solution.

3. The composition of claim 1, the composition having up to 80% lignin, up to 80% natural fibers, and up to 70% shellac.

4. The composition of claim 1, the composition having approximately 45% lignin, 50% wood fibers, and 5% shellac.

5. The composition of claim 1, wherein powdery lignin and powdery shellac are mixed with at least one of short-cut natural fibers and natural fibers having a flour-like consistency.

6. The composition of claim 1, wherein said natural fibers have dimensions between 10 $\mu$m and 10,000 $\mu$m.

7. The composition of claim 1, wherein a mixture of powdery lignin, shellac, and cut natural fibers is pressed into granulated shaped bodies as an intermediate product.

8. A method for the production of a shaped body from the composition of claim 1, the method comprising the steps of:
   a) thermally plastifying a dry mixture of polymer lignin, shellac, and natural fibers; and
   b) processing the mixture, in a plastic state, into the shaped body.

9. The method of claim 8, further comprising adding native oil sliding agent to the dry mixture.

10. The method of claim 9, wherein said sliding agent is added prior to step a).

11. The method of claim 9, wherein said sliding agent is added during step a).

12. The method of claim 8, wherein the shaped body is produced through extrusion.

13. The method of claim 8, wherein the shaped body is produced through hot-pressing.

* * * * *